United States Patent
Lepsoy et al.

(10) Patent No.: US 10,354,143 B2
(45) Date of Patent: Jul. 16, 2019

(54) METHOD AND SYSTEM FOR COMPARING VIDEO SHOTS

(71) Applicant: TELECOM ITALIA S.p.A., Milan (IT)

(72) Inventors: Skjalg Lepsoy, Turin (IT); Massimo Balestri, Turin (IT); Gianluca Francini, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 0 days.

(21) Appl. No.: 15/516,965

(22) PCT Filed: Oct. 13, 2014

(86) PCT No.: PCT/EP2014/071878
§ 371 (c)(1),
(2) Date: Apr. 5, 2017

(87) PCT Pub. No.: WO2016/058626
PCT Pub. Date: Apr. 21, 2016

(65) Prior Publication Data
US 2017/0249516 A1    Aug. 31, 2017

(51) Int. Cl.
*G06K 9/00* (2006.01)
*G06K 9/62* (2006.01)

(52) U.S. Cl.
CPC ........ *G06K 9/00758* (2013.01); *G06K 9/6211* (2013.01); *G06K 9/6215* (2013.01)

(58) Field of Classification Search
CPC . G06K 9/00758; G06K 9/6211; G06K 9/6215
See application file for complete search history.

(56) References Cited

U.S. PATENT DOCUMENTS

| 2013/0308861 A1* | 11/2013 | Cordara | G06K 9/6211 |
| | | | 382/170 |
| 2015/0016723 A1* | 1/2015 | Francini | G06K 9/6212 |
| | | | 382/170 |

(Continued)

OTHER PUBLICATIONS

Skjalg Lepsoy, et al., "Statistical Modelling of Outliers for Fast Visual Search," 2011 IEEE International Conference on Multimedia and Expo (ICME), XP031964858, Jul. 11, 2011, (6 pages).

(Continued)

*Primary Examiner* — Brenda C Bernardi
(74) *Attorney, Agent, or Firm* — Oblon, McClelland, Maier & Neustadt, L.L.P.

(57) ABSTRACT

A method (100) for comparing a first video shot (Vs1) comprising a first set of first images (I1(s)) with a second video shot (Vs2) comprising a second set of second images (I2(t)), at least one between the first and the second set comprising at least two images. The method comprises pairing (110) each first image of the first set with each second image of the second set to form a plurality of images pairs (IP(m)), and, for each image pair, carrying out the operations a)-g): a) identifying (120) first interest points in the first image and second interest points in the second image; b) associating (120) first interest points with corresponding second interest points in order to form corresponding interest point matches; c) for each pair of first interest points, calculating (130) the distance therebetween for obtaining a corresponding first length; d) for each pair of second interest points, calculating (130) the distance therebetween for obtaining a corresponding second length; e) calculating a plurality of distance ratios (130), each distance ratio corresponding to a selected pair of interest point matches and being based on a ratio of a first term and a second term or on a ratio of the second term and the first (Continued)

term, said first term corresponding to the distance between the first interest points of said pair of interest point matches and said second term corresponding to the distance between the second interest points of said pair of interest point matches; f) computing (140) a first representation of the statistical distribution of the plurality of calculated distance ratios; g) computing (150) a second representation of the statistical distribution of distance ratios obtained under the hypothesis that all the interest point matches in the image pair are outliers. The method further comprises generating (160) a first global representation of the statistical distribution of the plurality of calculated distance ratios computed for all the image pairs based on the first representations of all the image pairs; generating (170) a second global representation of the statistical distribution of distance ratios obtained under the hypothesis that all the interest point matches in all the image pairs are outliers based on the second representations of all the image pairs; comparing (180) said first global representation with said second global representation, and assessing (190) whether the first video shot contains a view of an object depicted in the second video shot based on said comparison.

10 Claims, 6 Drawing Sheets

(56) References Cited

U.S. PATENT DOCUMENTS

2016/0335523 A1\* 11/2016 Piotto ............... G06F 17/30247
2016/0350592 A1\* 12/2016 Ma ....................... G06K 9/4671

OTHER PUBLICATIONS

Josef Sivic, et al., "Video Google: Efficient Visual Search of Videos," Toward Category-Level Object Recognition Lecture Notes in Computer Science, XP019053244, Jan. 1, 2007, pp. 127-144.
A. Araujo, et al., "Efficient Video Search Using Image Queries," 2014 IEEE International Conference on Image Processing (ICIP), XP055192632, Oct. 1, 2014, (5 pages).
Gianluca Francini, et al., "Selection of local features for visual search," Signal Processing: Image Communication, vol. 28, No. 4, XP028526778, Nov. 19, 2012, pp. 311-322.
Fred Rothganger, et al., "Segmenting, Modeling, and Matching Video Clips Containing Multiple Moving Objects," IEEE Transactions on Pattern Analysis and Machine Intelligence, vol. 29, No. 3, XP002740470, pp. 477-491, 2007.
Huizhong Chen, "Huizhong Chen—Stanford University," URL:http://web.archive.org/web/20140924 02122/http://web.stanford.edu/hchen2/, XP055192619, retrieved Jun. 1, 2015, pp. 1-2.
International Search Report dated Jun. 12, 2015 in PCT/EP2014/071878, filed Oct. 13, 2014.

\* cited by examiner

US 10,354,143 B2

METHOD AND SYSTEM FOR COMPARING VIDEO SHOTS

BACKGROUND OF THE INVENTION

Field of the Invention

The present invention relates to the field of the image analysis.

Description of the Related Art

In the field of the image analysis, a common operation provides for comparing two images in order to find the relation occurring therebetween in case both the images include at least a portion of a same scene or of a same object.

Known methods for determining whether two images display the same object provide for selecting a set of so-called interest points in the first image and then matching each interest point of the set or a subset thereof to a corresponding interest point in the second image (generally, some of the selected interest points of the set may not be matched, because of ambiguities). The selection of which point of the first image should become an interest point is carried out by taking into consideration image features in the area of the image surrounding the point itself.

As it is well known to those skilled in the art, if a matching between an interest point of the first image and a corresponding interest point of the second image is correct, in the sense that both interest points correspond to a same point of a same object (depicted in both images), such interest point match is referred to as "inlier".

Conversely, if a matching between an interest point of the first image and a corresponding interest point of the second image is incorrect, in the sense that the two interest points do not correspond to a same point of the same object, such interest point match is referred to as "outlier".

Therefore, in order to obtain a reliable result, a procedure capable of distinguishing the inliers from the outliers is advantageously performed after the interest point matches have been determined.

Several examples of procedures of this type are already known in the art, such as for example the image comparison method disclosed in the patent application WO 2012/100819 in the name of the same present Applicant.

Another common operation in the field of the image analysis provides for comparing video shots, or comparing a single image to images of a video shot in order to find the relation occurring therebetween in case both the video shots or both the image and the video shot include at least a portion of a same scene or of a same object.

For example, "Efficient video search using image queries" by A. Araujo, M. Makar, V. Chandrasekhar, D. Chen, S. Tsai, H. Chen, R. Angst, B. Girod, *IEEE International Conference on Image processing*, October 2014, discloses a method of comparing images to video shots which checks geometric consistency using the Random sample consensus (RANSAC) iterative method.

The method disclosed in "Segmenting, modeling, and matching video clips containing multiple moving objects" by F. Rothganger, S. Lazebnik, C. Schmid, & J. Ponce, *IEEE Transactions on Pattern Analysis and Machine Intelligence*, 29(3), 2007, pages 477-491, provides a method for the identification of shots that depict the same scene in a video clip. In this case as well, geometric consistency is checked using the RANSAC method.

SUMMARY OF THE INVENTION

Applicant has found that the solutions known in the art for comparing video shots, or comparing a single image to images of a video shot, are affected by a severe drawback. The known solutions have a scarce robustness when the video shot comprises very small objects and/or in case the video shot comprises non detailed objects. Indeed, in these cases, only a small number of interest points may be identified within said objects, causing a possible failure of the identification thereof during the comparison operations.

The Applicant has tackled to problem of how to improve the known solutions in term of robustness.

The Applicant has found that, given two video shots each one comprising a respective group or set of images, by accumulating to each other histograms of interest point distance ratios corresponding to each image pair comprising an image of the first video shot and an image of the second video shot, a global histogram may be calculated which represents a statistical distribution of the distance ratios computed for all the image pairs. Thanks to said accumulation, the contribution of few selected interest points corresponding to small and/or poorly detailed objects is sensibly increased.

An aspect of the present invention provides for a method for comparing a first video shot comprising a first set of first images with a second video shot comprises a second set of second images. At least one between the first and the second set comprising at least two images. The method comprises pairing each first image of the first set with each second image of the second set to form a plurality of images pairs. The method further comprises, for each image pair, carrying out the operations a)-g):

a) identifying first interest points in the first image and second interest points in the second image;

b) associating first interest points with corresponding second interest points in order to form corresponding interest point matches;

c) for each pair of first interest points, calculating the distance therebetween for obtaining a corresponding first length;

d) for each pair of second interest points, calculating the distance therebetween for obtaining a corresponding second length;

e) calculating a plurality of distance ratios, each distance ratio corresponding to a selected pair of interest point matches and being based on a ratio of a first term and a second term or on a ratio of the second term and the first term, said first term corresponding to the distance between the first interest points of said pair of interest point matches and said second term corresponding to the distance between the second interest points of said pair of interest point matches;

f) computing a first representation of the statistical distribution of the plurality of calculated distance ratios;

g) computing a second representation of the statistical distribution of distance ratios obtained under the hypothesis that all the interest point matches in the image pair are outliers.

The method further comprises generating a first global representation of the statistical distribution of the plurality of calculated distance ratios computed for all the image pairs based on the first representations of all the image pairs, and generating a second global representation of the statistical distribution of distance ratios obtained under the hypothesis that all the interest point matches in all the image pairs are outliers based on the second representations of all the image pairs. The method still further comprises comparing said first global representation with said second global representation, and assessing whether the first video shot contains a view of an object depicted in the second video shot based on said comparison.

According to an embodiment of the present invention, the operation f) provides for arranging the plurality of distance ratios in a corresponding image pair histogram having a plurality of ordered bins, each one corresponding to a respective interval of distance ratio values. The image pair histogram enumerates for each bin a corresponding number of calculated distance ratios having values comprised within the respective interval.

According to an embodiment of the present invention, the operation provides for generating an image pair outlier probability mass function comprising for each of said bins the probability that, under the hypothesis that all the interest point matches are outliers, a distance ratio has a value that falls within said bin.

According to an embodiment of the present invention, the phase of generating a first global representation of the statistical distribution of the plurality of calculated distance ratios computed for all the image pairs based on the first representations of all the image pairs comprises generating a global histogram based on the image pair histograms. Said global histogram is indicative of how the values of the distance ratios calculated for all the image pairs are distributed among the bins.

According to an embodiment of the present invention, the phase of generating a second global representation of the statistical distribution of distance ratios obtained under the hypothesis that all the interest point matches in all the image pairs are outliers based on the second representations of all the image pairs comprises generating a global outlier probability mass function by combining the image pair outlier probability mass functions.

According to an embodiment of the present invention, the phase of comparing said first global representation with said second global representation comprises comparing said global histogram with said global outlier probability mass function.

According to an embodiment of the present invention, the phase of generating the global histogram based on the image pair histograms comprises, for each bin of the plurality of ordered bins, summing the number of calculated distance ratios corresponding to that bin of all image pair histograms.

According to an embodiment of the present invention, the phase of generating the image pair outlier probability mass function comprises calculating a linear combination of the image pair outlier probability mass functions.

According to an embodiment of the present invention, said comparing said first global representation with said second global representation comprises performing a Pearson's test.

According to an embodiment of the present invention, said calculating the distance ratios provides for calculating the logarithm of the distance ratios.

Another aspect of the present invention provides for a video shot comparing system. The video shot comparing system comprises a first unit configured to receive a first video shot comprising a first set of first images and identify first interest points in the first images, and a reference database storing a plurality of second video shot, each one comprising a respective second set of second images. The video shot comparing system further comprises a second unit configured to associate for each second video shot, and for each image pair comprising a second image of said second video shot and a first image of the first video shot, first interest points in said first image to second interest points in said second image in order to form corresponding interest point matches. The video shot comparing system further comprises a third unit configured to calculate, for each second video shots and for each image pair comprising a second image of said second video shot and a first image of the first video shot:

for each pair of first interest points, the distance therebetween for obtaining a corresponding first length;
for each pair of second interest points, the distance therebetween for obtaining a corresponding second length;
a plurality of distance ratios, each distance ratio corresponding to a selected pair of interest point matches and being based on a ratio of a first term and a second term or on a ratio of the second term and the first term, said first term corresponding to the distance between the first interest points of said pair of interest point matches and said second term corresponding to the distance between the second interest points of said pair of interest point matches;
a first representation of the statistical distribution of the plurality of calculated distance ratios;
a second representation of the statistical distribution of distance ratios obtained under the hypothesis that all the interest point matches in the image pair are outliers.

The video shot comparing system further comprises a fourth unit configured to generate for each second video shot:

a first global representation of the statistical distribution of the plurality of calculated distance ratios computed for all the image pairs comprising second images of said second video shot based on the first representations of all the image pairs comprising second images of said second video shot;
a second global representation of the statistical distribution of distance ratios obtained under the hypothesis that all the interest point matches in all the image pairs comprising second images of said second video shot are outliers based on the second representations of all the image pairs comprising second images of said second video shot The video shot comparing system further comprises a fifth unit configured to compare for each second video shot the corresponding first global representation with the corresponding second global representation, and to assess whether there is a second video shot containing a view of an object depicted in the first video shot based on said comparison.

BRIEF DESCRIPTION OF THE DRAWINGS

These and other features and advantages of the present invention will be made evident by the following description of some exemplary and non-limitative embodiments thereof, to be read in conjunction with the attached drawings, wherein.

DETAILED DESCRIPTION OF EXEMPLARY EMBODIMENTS OF THE INVENTION

Figure 1:
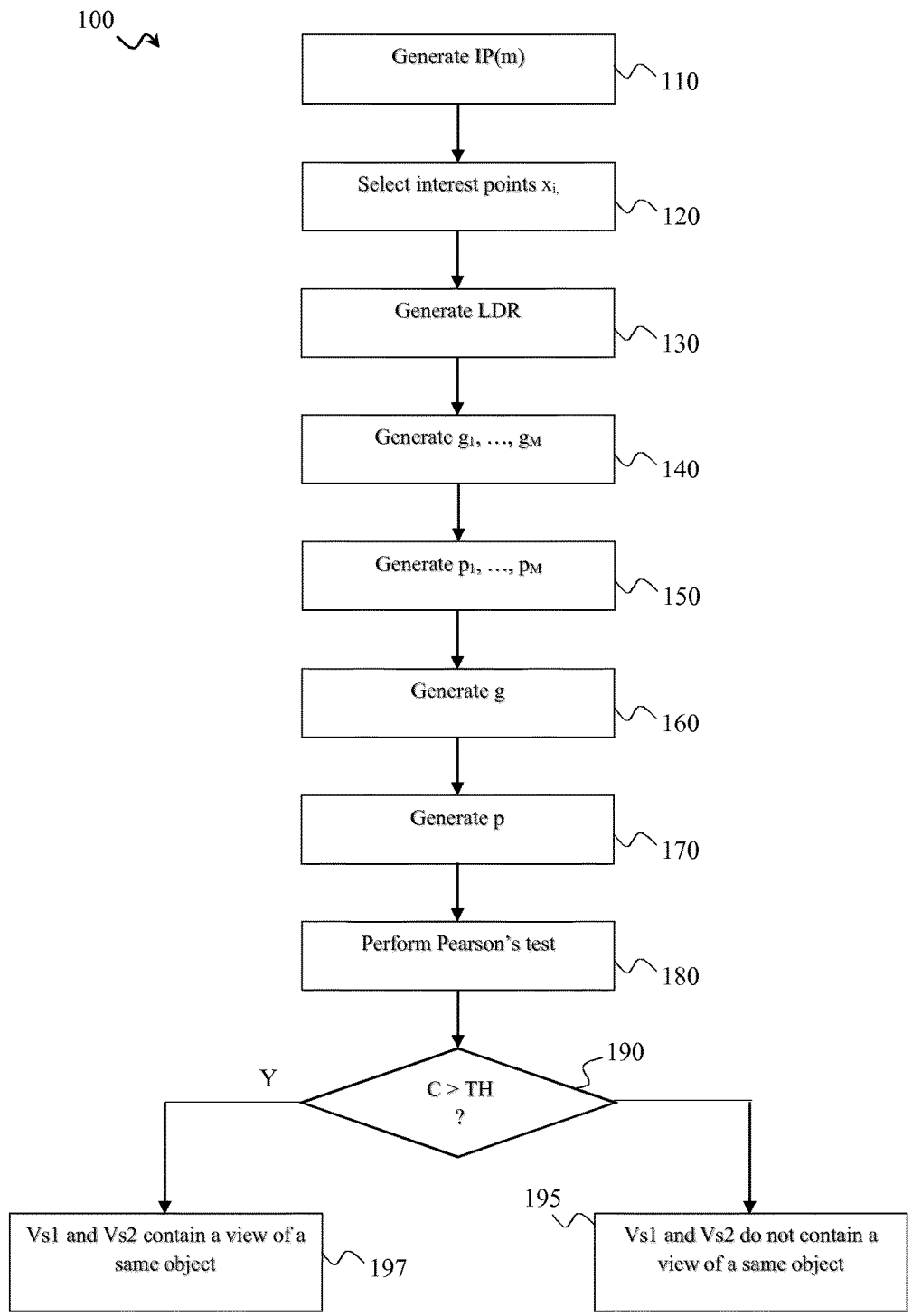
FIG. 1 illustrates the main phases of a video shot comparison method according to an embodiment of the present invention.

FIG. 1 illustrates the main phases of a novel video shot comparison method 100 adapted to assess whether two video shots Vs1, Vs2 contain a view of a same object according to an embodiment of the present invention. As specified in G. Davenport, T. A. Smith, and N. Pincever, "Cinematic primitives for multimedia", *IEE Computer Graphics and Application*, vol. 11, no. 4, pages 67-74, 1991, a video shot is a sequence of images (frames) generated and recorded contiguously and representing a continuous action in time and space.

The first phase of the method 100 (block 110 of FIG. 1) provides for selecting a first set of a images from the first video shot Vs1, selecting a second set of b images from the second video shot Vs2 (wherein at least one among a and b are higher than 1), and forming a plurality of M=a*b image pairs IP(m) (m=1 to M) by pairing each image of the first set with each image of the second set.

Figure 2:
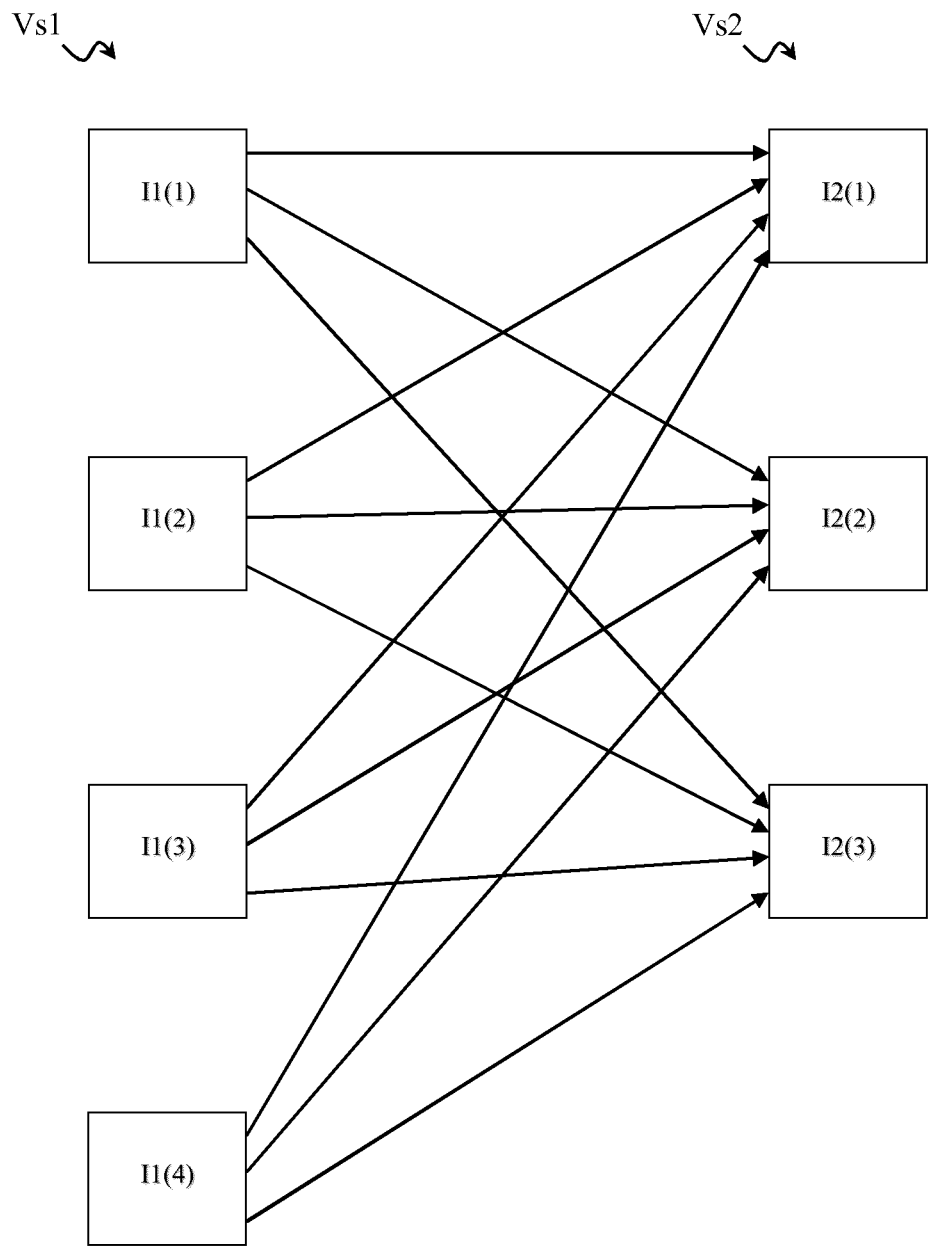
FIG. 2 illustrates an exemplary plurality of image pairs.

FIG. 2 illustrates an example in which the first set of images of the first video shot Vs1 comprises a=4 images I1(s) (s=1 to 4) and the second set of images of the second video shot Vs2 comprises b=3 images I2(t) (t=1 to 3). In this case, M=12 image pairs IP(m) are formed, each one comprising an image I1(s) of the first set and an image I2(t) of the second set:

$$IP(1) = \{I1(1), I2(1)\};$$
$$IP(2) = \{I1(1), I2(2)\};$$
$$IP(3) = \{I1(1), I2(3)\};$$
$$IP(4) = \{I1(2), I2(1)\};$$
$$\vdots$$
$$IP(12) = \{I1(4), I2(3)\}.$$

The second phase of the method 100 (block 120 of FIG. 1) provides for selecting for each one of the M image pairs IP(m) a set of interest points $x_i$ in the first image I1(s) of the image pair IP(m) and a set of interest points $y_i$ in the second image I2(t) of the image pair IP(m), and then matching each interest point $x_i$ of the first image I1(s) with a corresponding interest point $y_i$ of the second image I2(t), yielding $L_m$ matches. As it is well known to those skilled in the art, the selection of which points of the images I1(s), I2(t) have to become interest points $x_i$, $y_i$ may be carried out by taking into consideration local features of the area of the image surrounding the point itself exploiting known procedures, such as for example the procedure disclosed in the patent U.S. Pat. No. 6,711,293 or the procedure disclosed in the patent application PCT/EP2014/065808 in the name of the same present Applicant.

Figure 3:
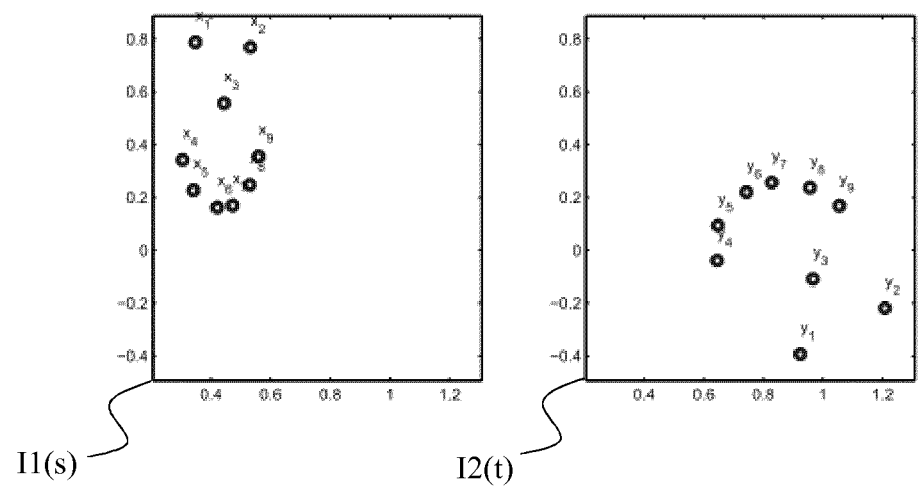
FIG. 3 illustrates an example in which a set of interest points in the first image of a image pair of FIG. 2 are matched with a set of interest points in the second image of the same image pair.

FIG. 3 illustrates an example in which $L_m=9$ interest points $x_i$ (i=1 to 9) in the first image I1(s) of a image pair IP(m) are matched with $L_m=9$ interest points $y_i$ (i=1 to 9) of the second image I2(t) of the same image pair IP(m) (with the interest point $x_1$ that is matched to the interest point $y_1$, the interest point $x_2$ that is matched to the interest point $y_2$, and so on).

The next phase of the method 100 (block 130 of FIG. 1) provides for calculating for each pair of interest point matches {($x_i$, $y_i$), ($x_j$, $y_j$)} of each one of the M image pairs IP(m) formed in the previous phase the so-called log distance ratio (LDR for short) proposed in "Fast geometric re-ranking for image-based retrieval" by Sam S. Tsai, Davide Chen, Gabriel Takacs, Vijay Chandrasekhar, Ramakrishna Vedantham, Radek Grzeszczuk, Bernd Girod, *International Conference on Image Processing*, October 2010:

$$LDR(x_i, x_j, y_i, y_j) = \ln\left(\frac{\|x_i - x_j\|}{\|y_i - y_j\|}\right), \quad (1)$$

wherein $x_i$ represents the coordinates of a generic i-th interest point $x_i$ in the first image I1(s) of a generic image pair IP(m), $y_i$ represents the coordinates of i-th interest point $y_i$ in the second image I2(t) matched with the interest point $x_i$ in the first image I1(s) of the same image pair IP(m), $x_j$ represents the coordinates of a different generic j-th interest point $x_j$ in the first image I1(s) of the same image pair IP(m), and $y_j$ represents the coordinates of the j-th interest point $y_j$ in the second image I2(t) matched with the interest point $x_j$ in the first image I1(s) of the same image pair IP(m). The interest points must be distinct, i.e., $x_i \neq x_j$, and $y_i \neq y_j$, and the LDR is undefined for i=j. The LDR is a function of the length ratio, an invariant for similarities. Thanks to the presence of the logarithm operator, if the first image I1(s) of an image pair IP(m) is exchanged with the second image I2(t) of the same image pair IP(m), (x becomes y and vice versa), the LDR simply reverses sign. Given a set of $L_m$ matched interest points ($x_i$, $y_i$) for a generic image pair IP(m)—including $L_m$ interest points $x_i$ in the first image I1(s) of the pair and $L_m$ corresponding interest points $y_i$ in the second image I2(t) of the pair—, there exists a number $$N_m = \frac{L_m \cdot (L_m - 1)}{2}$$

of distinct LDRs.

The next phase of the method 100 (block 140 of FIG. 1) comprises collecting for each image pair IP(m) the corresponding $N_m$ LDRs generated at the preceding phase in order to compute a corresponding first representation of the statistical distribution thereof. According to an embodiment of the present invention, said first representation of the statistical distribution of the $N_m$ LDRs collected for each image pair IP(m) is a histogram, herein referred to as image pair histogram $g_m$. In this way, M image pair histograms $g_m$ (m=1 to M) are generated, i.e., a respective image pair histogram $g_m$ per each image pair IP(m).

Each image pair histogram $g_m$ shows how the values of the $N_m$ LDRs that have been calculated for the corresponding image pair IP(m) are distributed. The image pair histograms $g_m$ are expressed in form of frequency arrays:

$$g_1 = [g_1(1), \ldots, g_1(k), \ldots, g_1(K)]$$
$$\vdots$$
$$g_m = [g_m(1), \ldots, g_m(k), \ldots, g_m(K)]$$
$$\vdots$$
$$g_M = [g_M(1), \ldots, g_M(k), \ldots, g_M(K)],$$

wherein each LDR may take values comprised within K predefined ordered intervals $T_1, \ldots, T_k, \ldots, T_K$—hereinafter referred to as bins—, and $g_m(k)$ is the number of LDRs (calculated for the image pair IP(m)) whose values fall within the k-th bin $T_k$.

For each image pair histogram $g_m$, the sum of histogram components $g_m(k)$ thereof is equal to the number $N_m$ of LDRs calculated for the corresponding image pair IP(m):

$$g_m(1) + \ldots + g_m(k) + \ldots + g_m(K) = N_m.$$

The total number N of LDRs calculated for all the image pairs IP(m) obtained from the two video shots Vs1 and Vs2 is equal to:

$$N = N_1 + \ldots + N_m + \ldots + N_M.$$

The next phase of the method 100 (block 150 of FIG. 1) comprises calculating for each image pair IP(m) a corresponding second representation of the statistical distribution of LDRs obtained under the hypothesis that all the interest point matches in the image pair are outliers. According to an embodiment of the present invention, said second representation of the statistical distribution of LDRs obtained under the hypothesis that all the interest point matches in the image pair are outliers is a probability mass function, referred to as image pair outlier probability mass function $p_m$:

$$p_1 = [p_1(1), \ldots, p_1(k), \ldots, p_1(K)]$$
$$\vdots$$
$$p_m = [p_m(1), \ldots, p_m(k), \ldots, p_m(K)]$$
$$\vdots$$
$$p_M = [p_M(1), \ldots, p_M(k), \ldots, p_M(K)],$$

wherein $p_m(k)$ is the probability that, under the hypothesis that all the interest point matches for the m-th image pair IP(m) are outliers, a LDR calculated using a pair of interest point matches $\{(x_i, y_i), (x_j, y_j)\}$ from said image pair IP(m) has a value that falls within the k-th bin $T_k$. The various image pair outlier probability mass functions $p_m$ may be calculated based on a discretization of an outlier probability density function whose closed form is:

$$f_z(z; d) = 2\left(\frac{de^z}{e^{2z} + d^2}\right)^2$$

wherein z is the LDR value, and d is the ratio between the standard deviations of the coordinates of the interest points in the images (see equation (6) of S. Lepsoy, G. Francini, G. Cordara, and P. P. de Gusmao, "Statistical modelling of outliers for fast visual search", in *IEEE International Conference on Multimedia and Expo (ICME), pages* 1-6, *IEEE*, 2011). In other words, each image pair outlier probability mass function $p_m$ corresponding to an image pair IP(m) is the probability mass function of LDRs calculated using pairs of interest point matches $\{(x_i, y_i), (x_j, y_j)\}$ obtained by selecting the interest points from said image pair IP(m) in a random way.

It has to be appreciated that the image pair outlier probability mass functions $p_m$ corresponding to two different image pairs IP(m) may be different to each other, being dependent on the actual arrangement of the interest points $x_i$, $y_i$ in the two image pairs IP(m).

The phases of the method 100 described until now (blocks 110-150 of FIG. 1) regarded operations which have been carried out on each image pair IP(m) in an independent way, i.e., without taking into considerations the relationships occurring among them.

The next phases of the method 100 (blocks 160-190 of FIG. 1) will regard instead all the image pairs IP(m) considered together.

The first phase of the method 100 having said features (block 160) provides for generating a global representation of the statistical distribution of the LDR values computed for all the image pairs IP(m). According to an embodiment of the present invention, said global representation is a further histogram, herein referred to as global histogram g, which is indicative of how the values of the LDRs calculated for all the image pairs IP(m) are distributed among the K bins $T_1, \ldots, T_k, \ldots, T_K$. The global histogram g is generated in the following way:

$$g = g_1 + \ldots + g_m + \ldots + g_M = [g(1), \ldots, g(k), \ldots, g(K)],$$

wherein:

$$g(k) = g_1(k) + \ldots + g_m(k) + \ldots + g_M(k)$$

is the number of LDRs (by considering all the image pairs IP(m)) whose values fall within the k-th bin $T_k$.

The next phase of the method (block 170) provides for generating a global representation of the statistical distribution of LDR values obtained under the hypothesis that all the interest point matches in all the image pairs IP(m) are outliers. According to an embodiment of the present invention, said global representation is a further probability mass function, herein referred to as global outlier probability mass function p, which is generated by means of a linear combination of the image pair outlier probability mass functions $p_m$ of all the image pairs IP(m):

$$p = [p(1), \ldots, p(k), \ldots p(K)],$$

wherein:

$$p(k) = \frac{1}{N} \sum_{m=1}^{M} N_m \cdot p_m(k)$$

wherein p(k) is the probability that, under the hypothesis that all the interest point matches for all the image pairs IP(m) are outliers, a LDR calculated using a pair of interest point matches $\{(x_i, y_i), (x_j, y_j)\}$ from a generic image pair IP(m) has a value that falls within the k-th bin $T_k$.

In other words, the global outlier probability mass function p is the probability mass function of LDRs calculated using pairs of interest point matches $\{(x_i, y_i), (x_j, y_j)\}$ obtained by selecting the interest points from any of the image pairs IP(m) in a random way.

The next phase of the method (block 180 of FIG. 1), provides for comparing the global histogram g—which is indicative of how the values of the LDRs calculated for all the image pairs IP(m) obtained from the two video shots Vs1 and Vs2 to be compared are distributed—with the global outlier probability mass function p—which is indicative of how the values of the LDRs are distributed if wrong (i.e., random) interest point matches are selected from all the image pairs IP(m). This comparison is carried out by estimating the difference in shape between the global histogram g and the global outlier probability mass function p.

Indeed, the components of the global histogram g that are due to wrong matches will have a shape similar to that of global outlier probability mass function p, while the components of the global histogram g that are due to correct matches will have a shape different from that of the global outlier probability mass function p.

The difference in shape between the global histogram g and the global outlier probability mass function p is estimated by means of the known Pearson's test disclosed at pages 402-403 of "An introduction to Mathematical Statistics and its Applications" by R. J. Larsen and M. L. Marx, New Jersey, Prentice-Hall, second edition, 1986.

The Pearson's test statistic c is computed in the following way:

$$c = \sum_{k=1}^{K} \frac{(g(k) - N \cdot p(k))^2}{N \cdot p(k)}$$

The more the shape of the global histogram g is similar to that of the global outlier probability mass function p, the lower the value of the Pearson's test statistic c.

For this purpose, the next phase of the method 100 (block 190 of FIG. 1) provides for checking whether the Pearson's test statistic c calculated above is higher or lower than a threshold TH.

If the Pearson's test statistic c is lower than the threshold TH (exit branch N of block 190), it means that the shape of the global histogram g is sufficiently similar to that of the global outlier probability mass function p to assume that the interest point matches among the M image pairs IP(m) are wrong (i.e., outliers). In this case, the video shots Vs1 and Vs2 are considered not to contain a view of a same object (block 195).

If the Pearson's test statistic c is higher than the threshold TH (exit branch Y of block 190), it means that the shape of the global histogram g is sufficiently different from the shape of the global outlier probability mass function p to assume that there are a sufficiently high number of interest point matches among the M image pairs IP(m) which are correct (i.e., inliers). In this case, the video shots Vs1 and Vs2 are considered to contain a view of a same object (block 197).

As it is well known to those skilled in the art, the value of the threshold TH to be exploited in the Pearson's test should be set based on the number of false positives which can be tolerated.

Compared with the known solutions, the proposed method is more robust, since it allows the identification of small and/or poorly detailed objects depicted in the images of the video shots. Indeed, even if only a small amount of interest points are selected that correspond to such small and/or poorly detailed objects, during the generation of the global histogram, the components corresponding to such few interest points are accumulated for each image pair, increasing their whole contribution. The capacity of assessing whether two video shots depict a same object or a same scene increases with the total number of interest point matches, such that video shots depicting a same object or a same scene are detected also when the number of inliers are few with respect to the total number of matched interest points.

Figure 4:
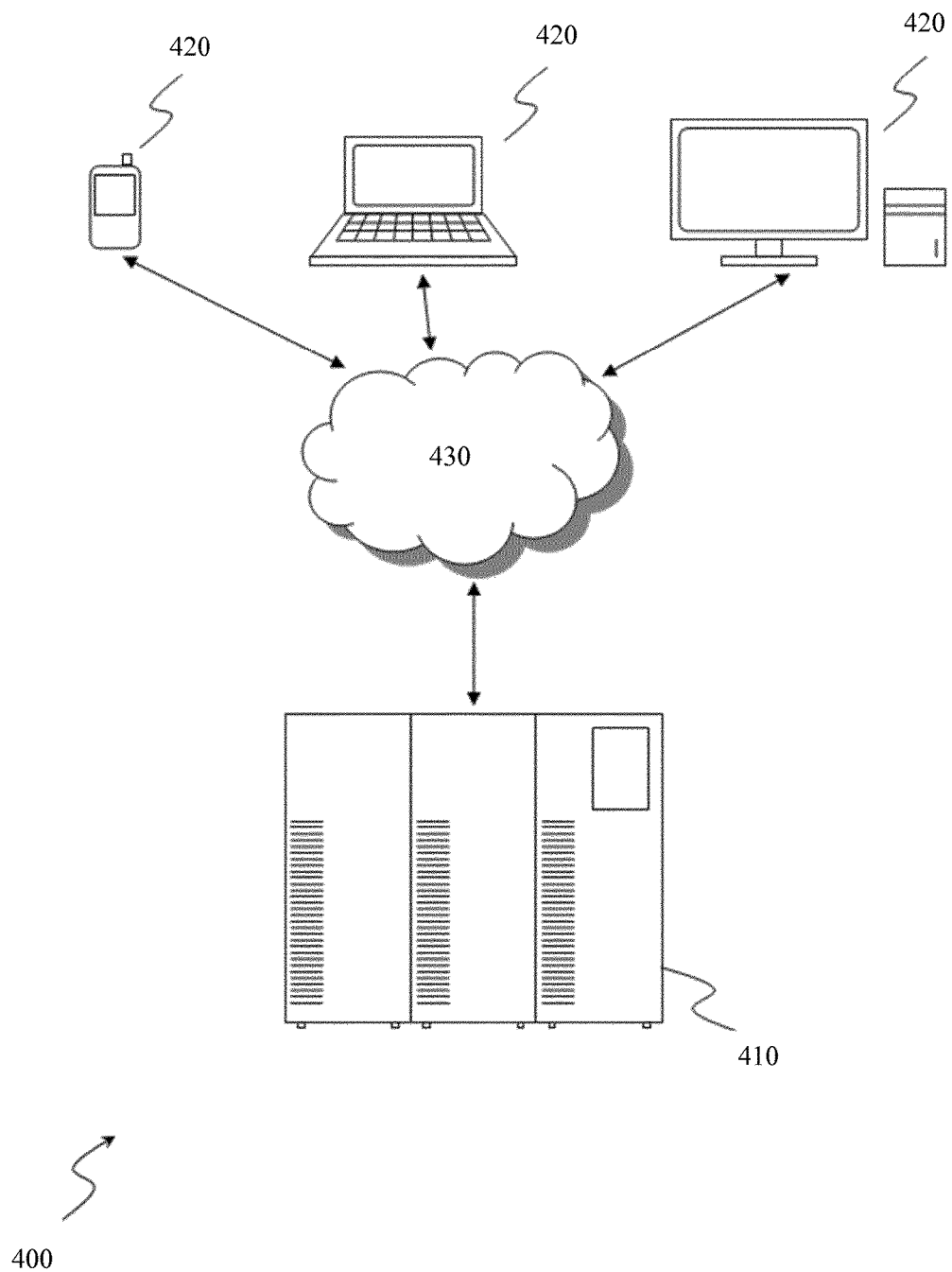
FIG. 4 schematically illustrates a possible scenario wherein the method according to an embodiment of the present invention may be exploited for implementing a visual searching service according to embodiments of the present invention.

FIG. 4 schematically illustrates a possible scenario wherein the previously described method may be exploited for implementing a visual searching service according to embodiments of the present invention. The scenario of FIG. 4—identified with the reference 400—is structured according to a client-server configuration, wherein a visual search server 410 is configured to interact with a plurality of terminals 420 for exchanging data through an external network 430, such as a MAN, a WAN, a VPN, Internet or a telephone network. Each terminal 420 may be a personal computer, a notebook, a laptop, a personal digital assistant, a smartphone, or whichever electronic device capable of managing a digital video shot.

Figure 5A:
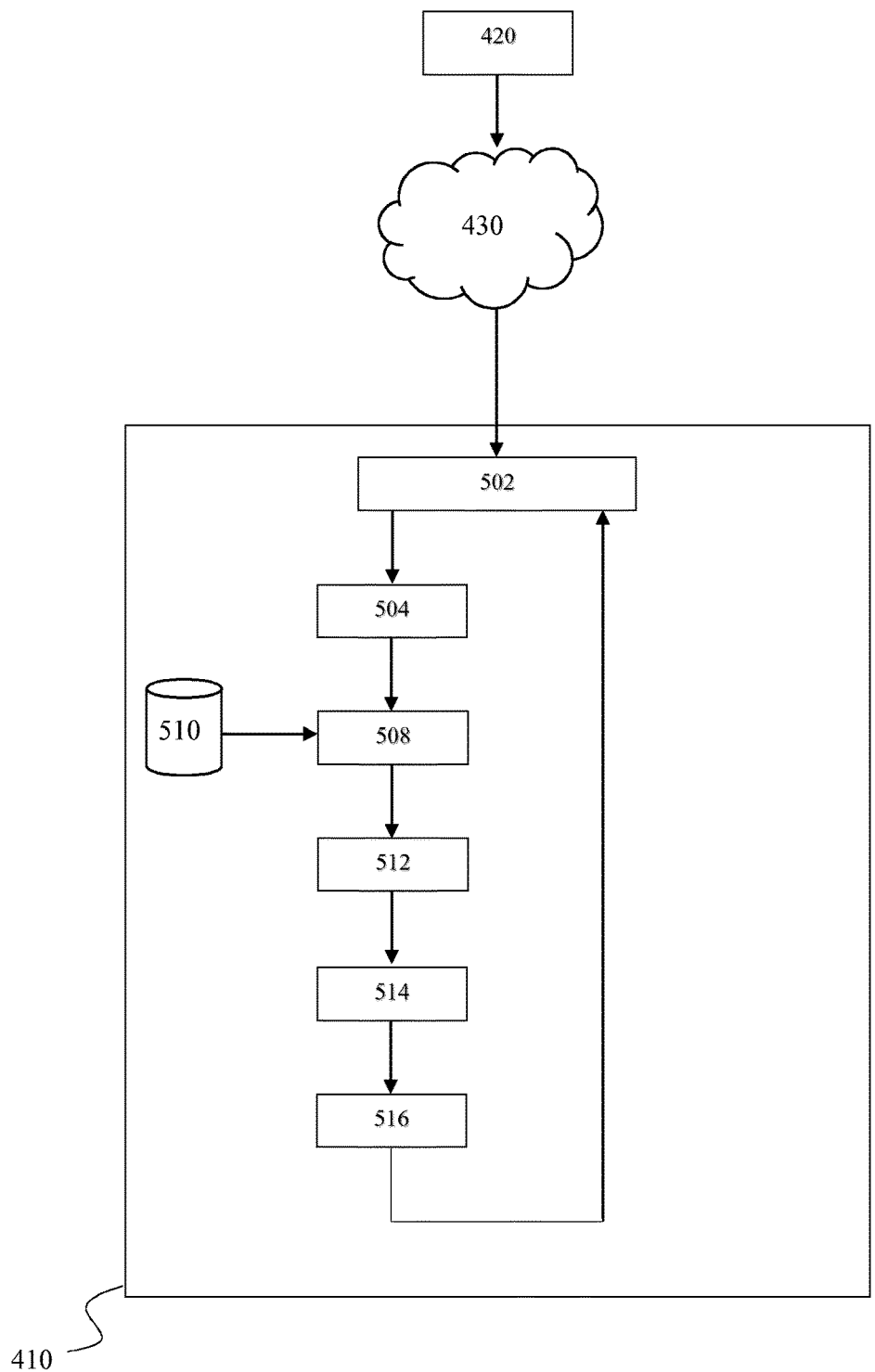
FIG. 5A illustrates a system implementing a visual searching service according to an embodiment of the present invention.

According to an embodiment of the present invention illustrated in FIG. 5A, all the main operations of the visual searching service are carried out by the visual search server 410.

A user of a terminal 420 requesting information related to an object depicted in a video shot, sends said video shot (query video shot) to the visual search server 410 through the network 430.

The visual search server 410 includes a server interface 502 adapted to interact with the network 430 for receiving/transmitting data from/to the terminals 420. Through the server interface 502, the visual search server 410 receives the query video shot to be analyzed.

The query video shot is provided to an interest point detection unit 504 configured to identify the interest points within the images of the query video shot.

The visual search server 410 further includes a matching unit 508 coupled with a reference database 510 storing a plurality of pre-processed reference video shots. For each reference video shot, and for each image pair comprising an image of said reference video shot and an image of the query video shot, a matching is made among interest points of the two images of said image pair.

The visual search server 410 further comprises a first processing unit 512 configured to:
calculate for each reference video shot and for each image pair involving an image of said reference video shot and an image of the query video shot the LDRs for each corresponding interest point match generated by the matching unit 508,
arranging the LDRs of each image pair in a corresponding image pair histogram, and
calculating for each image pair a corresponding image pair outlier probability mass function.

The visual search server 410 further comprises a second processing unit 514 configured to generate for each reference video shot:
a global histogram (by using the image pair histograms corresponding to said reference video shot and said query video shot), and
a global outlier probability mass function (by using the image pair outlier probability mass functions corresponding to said reference video shot and said query video shot).

The visual search server 410 further comprises a decisional unit 516 that is configured to assess whether there is a reference video shot containing a view of an object depicted in the query video shot. For this purpose, the decisional unit 516 is configured to make for each reference video shot a comparison between the corresponding global histogram and the global outlier probability mass function.

The decisional unit 516 is further configured to provide the results to the terminal 420 through the network 430.

Figure 5B:
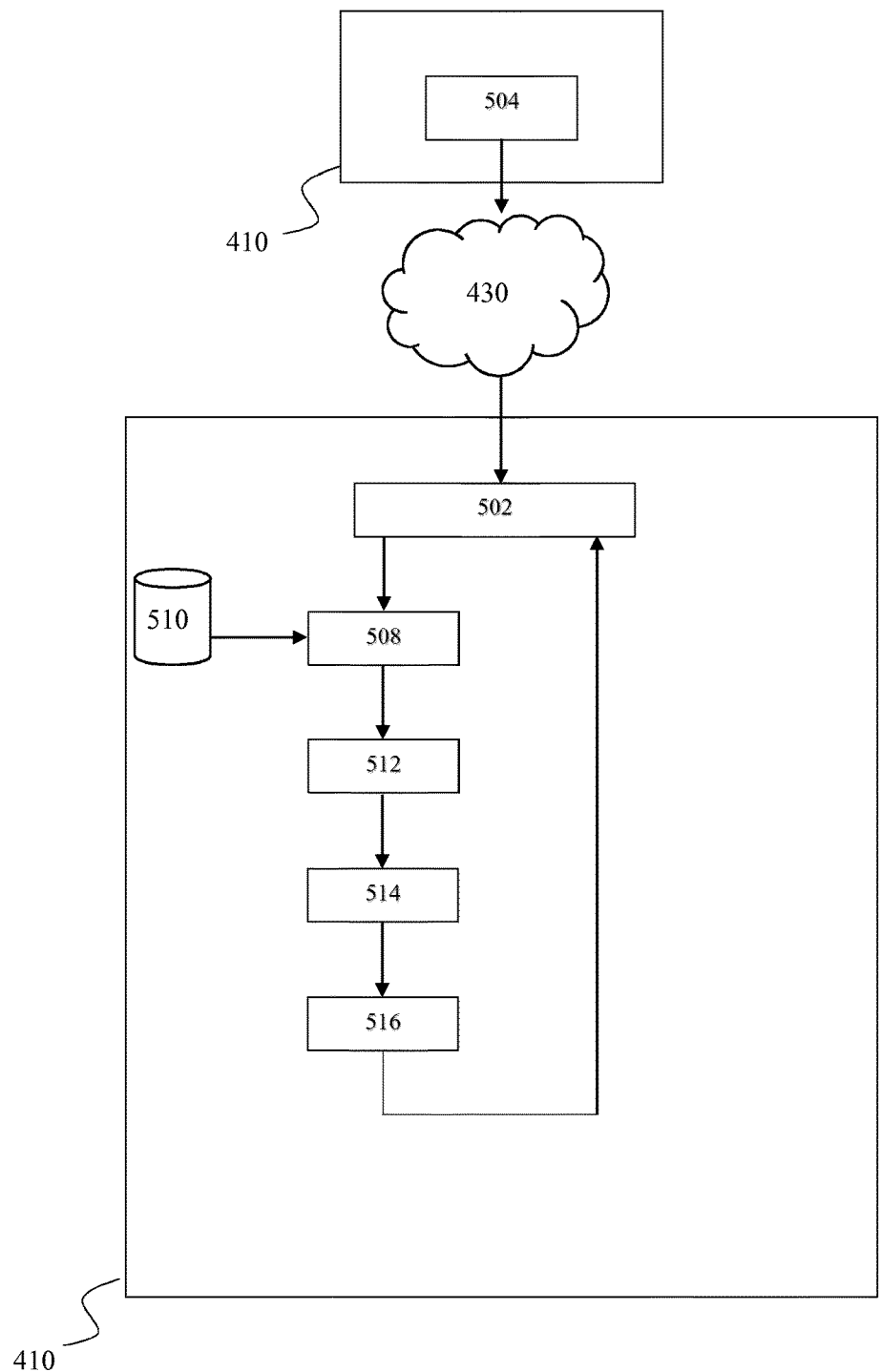
FIG. 5B illustrates a system implementing a visual searching service according to another embodiment of the present invention.

According to a further embodiment of the present invention illustrated in FIG. 5B, the interest point detection unit 504 is directly included in the terminals 420 instead of being included in the visual search server 410. In this case, instead of sending the query video shot to the visual search server 410, each terminal 420 is capable of directly sending the interest points locally generated from the images of the query video shots.

The previous description presents and discusses in detail several embodiments of the present invention; nevertheless, several changes to the described embodiments, as well as different invention embodiments are possible, without departing from the scope defined by the appended claims.

For example, although in the present description reference has been made to the log distance ratio (LDR), similar considerations apply if the histograms are construed with a difference distance ratio, such as a plain distance ratio, without the logarithm; moreover, similar considerations apply if the histograms are construed with multiples and/or powers of the log distance ratio.

Moreover, the concepts of the present inventions can be applied even if the widths of the bins of the histograms are different to each other.

The invention claimed is:

1. A method for comparing a first video shot comprising a first set of first images with a second video shot comprising a second set of second images, at least one between the first and the second set comprising at least two images, the method comprising:
   pairing each first image of the first set with each second image of the second set to form a plurality of images pairs;
   for each image pair, carrying out the operations a) –g):
   a) identifying first interest points in the first image and second interest points in the second image;
   b) associating first interest points with corresponding second interest points in order to form corresponding interest point matches;
   c) for each pair of first interest points, calculating a distance therebetween for obtaining a corresponding first length;
   d) for each pair of second interest points, calculating a distance therebetween for obtaining a corresponding second length;
   e) calculating a plurality of distance ratios, each distance ratio corresponding to a selected pair of interest point matches and being based on a ratio of a first term and a second term or on a ratio of the second term and the first term, said first term corresponding to the distance between the first interest points of said pair of interest point matches and said second term corresponding to the distance between the second interest points of said pair of interest point matches;
   f) computing a first statistical distribution of the plurality of calculated distance ratios, the first statistical distribution being an image pair histogram;
   g) computing a second statistical distribution of distance ratios obtained under the hypothesis that all the interest point matches in the image pair are outliers, the second statistical distribution being an image pair outlier probability mass function;
   generating a first global statistical distribution of the plurality of calculated distance ratios computed for all the image pairs based on the first statistical distributions of all the image pairs, the first global statistical distribution being a global histogram;
   generating a second global statistical distribution of distance ratios obtained under the hypothesis that all the interest point matches in all the image pairs are outliers based on the second statistical distributions corresponding to a random selection of interest points from all of the image pairs, the second global statistical distribution being a global outlier probability mass function;
   comparing said first global statistical distribution with said second global statistical distribution by estimating a difference in shape between the first global statistical distribution and the second global statistical distribution, and
   assessing whether the first video shot contains a view of an object depicted in the second video shot based on said comparison, the first video shot being determined to contain a view of the object depicted in the second video shot when the difference in shape between the first global statistical distribution and the second global statistical distribution exceeds a predetermined threshold.

2. The method of claim 1, wherein the operation f) provides for arranging the plurality of distance ratios in the image pair histogram according to a plurality of ordered bins of the image pair histogram, each one of the plurality of bins corresponding to a respective interval of distance ratio values, the image pair histogram enumerating for each bin a corresponding number of calculated distance ratios having values comprised within the respective interval.

3. The method of claim 2, wherein the image pair outlier probability mass function includes for each of said bins the probability that, under the hypothesis that all the interest point matches are outliers, a distance ratio has a value that falls within said bin.

4. The method of claim 3, wherein generating the first global statistical distribution of the plurality of calculated distance ratios computed for all the image pairs based on the first statistical distribution of all the image pairs comprises generating the global histogram based on the image pair histograms, said global histogram being indicative of how the values of the distance ratios calculated for all the image pairs are distributed among the bins.

5. The method of claim 4, wherein generating the second global statistical distribution of distance ratios obtained under the hypothesis that all the interest point matches in all the image pairs are outliers based on the second representations of all the image pairs comprises generating the global outlier probability mass function by combining the image pair outlier probability mass functions.

6. The method of claim 5, wherein generating the global histogram based on the image pair histograms comprises:
   for each bin of the plurality of ordered bins, summing a number of calculated distance ratios corresponding to that bin of all image pair histograms.

7. The method of claim 6, wherein generating the image pair outlier probability mass function comprises calculating a linear combination of the image pair outlier probability mass functions.

8. The method of claim 1, wherein said comparing said first global statistical distribution with said second global statistical distribution comprises performing a Pearson's test.

9. The method of claim 1, wherein said calculating the distance ratios includes calculating the logarithm of the distance ratios.

10. A video shot comparing system comprising:
a communication interface configured to receive a first video shot comprising a first set of first images and identify first interest points in the first images;
a reference database storing a plurality of second video shots, each one comprising a respective second set of second images; and
circuitry configured to
  associate for each second video shot, and for each image pair comprising a second image of said second video shot and a first image of the first video shot, first interest points in said first image to second interest points in said second image in order to form corresponding interest point matches;
  calculate, for each second video shots and for each image pair comprising a second image of said second video shot and a first image of the first video shot:
    for each pair of first interest points, a distance therebetween for obtaining a corresponding first length;
    for each pair of second interest points, a distance therebetween for obtaining a corresponding second length;
    a plurality of distance ratios, each distance ratio corresponding to a selected pair of interest point matches and being based on a ratio of a first term and a second term or on a ratio of the second term and the first term, said first term corresponding to the distance between the first interest points of said pair of interest point matches and said second term corresponding to the distance between the second interest points of said pair of interest point matches;
    a first statistical distribution of the plurality of calculated distance ratios, the first statistical distribution being an image pair histogram;
    a second statistical distribution of distance ratios obtained under the hypothesis that all the interest point matches in the image pair are outliers, the second statistical distribution being an image pair outlier probability mass function;
  generate for each second video shot:
    a first global statistical distribution of the plurality of calculated distance ratios computed for all the image pairs comprising second images of said second video shot based on the first statistical distributions of all the image pairs comprising second images of said second video shot, the first global statistical distribution being a global histogram;
    a second global statistical distribution of distance ratios obtained under the hypothesis that all the interest point matches in all the image pairs comprising second images of said second video shot are outliers based on the second statistical distributions corresponding to a random selection of interest points from all of the image pairs comprising second images of said second video shot, the second global statistical distribution being a global outlier probability mass function; and
  compare for each second video shot the corresponding first global statistical distribution with the corresponding second global statistical distribution, and assess whether there is a second video shot containing a view of an object depicted in the first video shot based on said comparison,
  wherein comparison of the corresponding first global statistical distribution with the corresponding second global statistical distribution includes estimating a difference in shape between the corresponding first global statistical distribution and the corresponding second global statistical distribution, and
  the first video shot is determined to contain a view of the object depicted in the second video shot when the difference in shape between the first global statistical distribution and the second global statistical distribution exceeds a predetermined threshold.

\* \* \* \* \*